United States Patent
Potekev et al.

(10) Patent No.: US 6,201,246 B1
(45) Date of Patent: Mar. 13, 2001

(54) NON-IMAGING OPTICAL CONCENTRATOR FOR USE IN INFRARED REMOTE CONTROL SYSTEMS

(75) Inventors: Franc Potekev, Wilsonville; Andrei Kazmierski, Tualatin, both of OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/127,591

(22) Filed: Jul. 31, 1998

(51) Int. Cl.⁷ .................................................. G02B 17/00
(52) U.S. Cl. ............................. 250/353; 250/DIG. 1; 359/850; 359/853; 359/858
(58) Field of Search ................. 250/353, 338.1, 250/363.1, DIG. 1; 385/133; 359/439, 615, 850, 853, 858

(56) References Cited

U.S. PATENT DOCUMENTS 5,452,135 * 9/1995 Maki et al. ............................ 359/834
5,695,152 * 12/1997 Levy ..................................... 244/3.13
5,727,108 * 3/1998 Hed ...................................... 385/133
6,084,552 * 7/2000 Robertson et al. ................... 343/753

* cited by examiner

Primary Examiner—Constantine Hannaher
(74) Attorney, Agent, or Firm—Stoel Rives LLP

(57) ABSTRACT

A non-imaging optical concentrator (18, 70) includes an optically transparent body having a substantially dome-shaped convex surface (42, 74) of revolution formed about an optical axis (24) and at least one conical concave surface of revolution (44, 76, 78) protruding into the convex surface in a direction along the optical axis toward a light sensor (46). The convex surface receives light rays (54, 90) propagating from low to medium elevational angles and causes them to propagate through the optically transparent body, reflect off the concave surface, and propagate generally along the optical axis toward the light sensor. The concave surface further receives light rays (58) propagating from high elevational angles and refracts them through the optically transparent body toward the light sensor. This invention is advantageous because only one light sensor is required to receive light rays, such as IR controller data, propagating from a wide range of elevational and azimuthal angles.

35 Claims, 2 Drawing Sheets

NON-IMAGING OPTICAL CONCENTRATOR FOR USE IN INFRARED REMOTE CONTROL SYSTEMS

TECHNICAL FIELD

This invention relates to non-imaging optical concentrators and more particularly to an infrared ("IR") receiver optical system employed in remote control systems of multimedia projectors.

BACKGROUND OF THE INVENTION

Projection systems have been used for many years to project motion pictures and still photographs onto screens for viewing. In the recent past, slide and overhead transparency projectors were commonly used for conducting sales demonstrations, business meetings, and classroom instruction. Slide projectors were commonly controlled by a remote control unit that was electrically connected to the slide projector by a cable that allowed a presenter, such as a salesperson, instructor, or project manager, to stand next to the projector or the projection screen while conducting the slide presentation. However, the cable limited the presenter's mobility and presented a tripping hazard, especially in darkened rooms.

More recently, slide and overhead presentations have been largely replaced by presentations employing multimedia projection systems. In a typical operating mode, multimedia projection systems receive video signals from a personal computer ("PC"), a tape drive, a disk drive, or some other form of image generating or storing device. The video signals may represent still, partial-, or full-motion display images of a type typically rendered by PCs. The video signals are converted in the multimedia projection system into signals that control a digitally driven imaging device that forms the image to be projected.

The presenter typically controls the multimedia projection system with a wireless IR remote control device similar to ones employed to control home television receivers. This has greatly increased the mobility of the presenter and eliminated the tripping hazard. In fact, multimedia projectors have grown in popularity to the point where they are available in diverse models suited for, among others, portable, tabletop, ceiling-hung, and rear-projected applications.

Because battery powered IR remote control devices are typically quite directional, the wide variety of possible projector placements and various possible presenter positions causes a dilemma. The presenter can usually point the IR remote control transmitter toward the multimedia projector, but proper placement of the IR receiver on the multimedia projector is indeterminate. Suitable IR receiver mounting positions may include top mounting when the presenter is standing close to the multimedia projector, front mounting when the presenter is standing near the projection screen, and rear mounting when the presenter is behind the multimedia projector. Top mounting may also be suitable in ceiling-hung applications in which the multimedia projector is hung upside down. Clearly no single IR receiver position was suitable for all applications, so prior workers placed multiple IR receivers on the major surfaces of the multimedia projectors, an unduly complex and costly solution.

Prior IR receivers are directional primarily because the optical components coupling IR energy to an IR sensor have a limited range of angular coverage. Indeed, the most common optical component is merely an optical window having a spectral filtering property that improves the signal-to-noise ratio of the sensed IR energy. Attempts to compensate for the directionality of prior IR receivers included increasing IR transmitter power and/or IR receiver sensitivity. Unfortunately, the former solution unacceptably increased battery consumption and the latter solution was marginal because receiver sensitivity was already typically maximized.

What is needed, therefore, is an IR receiver employing a single IR sensor and having usable sensitivity to received IR energy over a wide range of azimuthal and elevation angles.

SUMMARY OF THE INVENTION

An object of this invention is, therefore, to provide an apparatus and a method for receiving light rays propagating from multiple angles and directing them toward a light sensor.

Another object of this invention is to provide a non-imaging optical concentrator apparatus.

A further object of this invention is to provide an omni-directional IR receiver usable with a remote controller in a multimedia projection application.

A non-imaging optical concentrator receives light rays propagating from a wide range of elevational and azimuthal angles relative to an optical axis and directs them toward a light sensor. In a first embodiment, the optical concentrator includes an optically transparent body including a substantially dome-shaped convex surface of revolution formed about the optical axis and a conical concave surface of revolution formed about the optical axis and protruding into the convex surface in a direction along the optical axis in a direction toward the light sensor. The convex surface receives light rays propagating from low elevational angles and causes them to propagate through the optically transparent body, reflect off the concave surface, and propagate generally along the optical axis toward the light sensor. The concave surface further receives light rays propagating from high elevational angles and refracts them through the optically transparent body toward the light sensor.

In a second embodiment, the optically transparent body further includes a second conical concave surface of revolution formed about the optical axis and protruding from near the apex of the first conical concave surface deeper into the optically transparent body in a direction along the optical axis. In this embodiment, the convex surface further receives light rays propagating from medium elevational angles and causes them to propagate through the optically transparent body and reflect at relatively low angles off the first and second concave surfaces in a direction generally along the optical axis toward the light sensor. In a manner similar to the first concave surface, the second concave surface further receives light rays propagating from high elevational angles and refracts them through the optically transparent body toward the light sensor.

The non-imaging optical concentrator of this invention is advantageous because only one light sensor is required to receive IR controller data propagating from a wide range of elevational and azimuthal angles. It is, therefore, particularly useful for use in multimedia projector applications.

Additional objects and advantages of this invention will be apparent from the following detailed description of preferred embodiments thereof that proceeds with reference to the accompanying drawings.

DETAILED DESCRIPTION OF PREFERRED EMBODIMENTS

Figure 1:
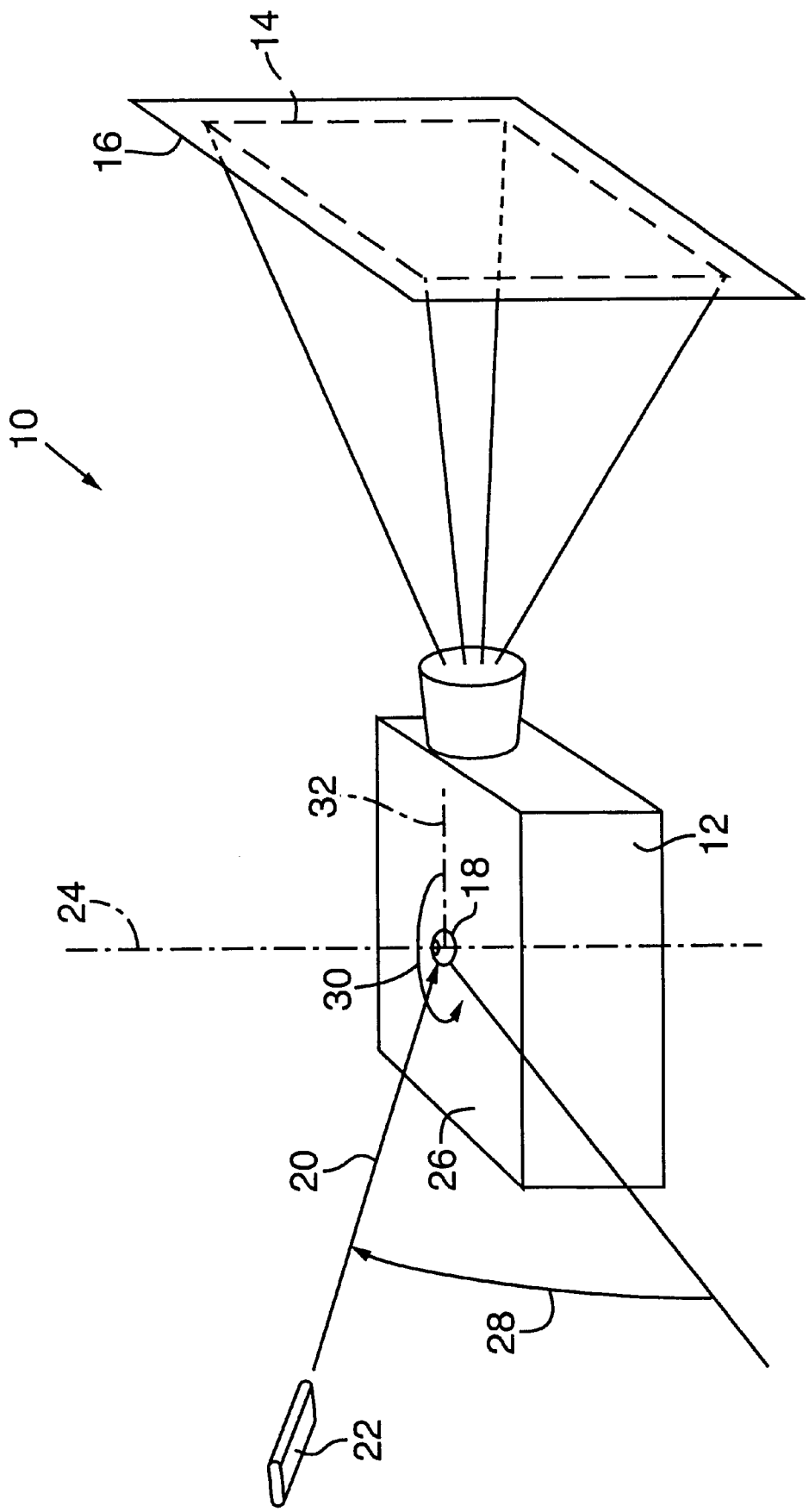
FIG. 1 is a pictorial isometric view of a multimedia projection system employing an omnidirectional IR remote control receiver of this invention.

A projection system 10 of this invention includes a multimedia projector 12 that projects an electronically generated image 14 on a projection screen 16. Multimedia projector 12 includes a non-imaging optical concentrator 18 (hereafter "optical concentrator 18") that receives light rays 20 from a remote control unit 22. Light rays 20 preferably include IR wavelengths but may include visible, ultraviolet ("UV"), and near- and far-IR wavelengths. Optical concentrator 18 has an optical axis 24 and is mounted on a top surface 26 of multimedia projector 12 such that optical axis 24 extends vertically in a direction substantially normal to top surface 26. In this preferred mounting orientation, optical concentrator 18 can receive light rays 20 propagating from a wide range of elevational angles 28 and azimuthal angles 30.

As a labeling convention for this application, elevational angles 28 and azimuthal angles 30 are measured relative to an imaginary plane that is transverse to optical axis 24 and cuts through optical concentrator 18. For practical purposes the imaginary plane may be considered as being substantially coplanar with top surface 26 of multimedia projector 12. Elevational angles 28 are, therefore, expressed as angles ranging from 0 degrees (when aligned with top surface 26) to 90 degrees (when aligned with optical axis 24), and azimuthal angles 30 are expressed as 0- to 360-degree angles relative to a reference line 32 that points toward projection screen 16 and lays in top surface 26. By way of example only, FIG. 1 shows an elevational angle 28 of about 40 degrees and an azimuthal angle 30 of about 240 degrees. However, optical concentrator 18 effectively receives light rays 20 propagating from elevational angles 28 ranging from about 0 degrees to about 90 degrees and from azimuthal angles 30 ranging from about 0 degrees to about 360 degrees.

Figure 2:
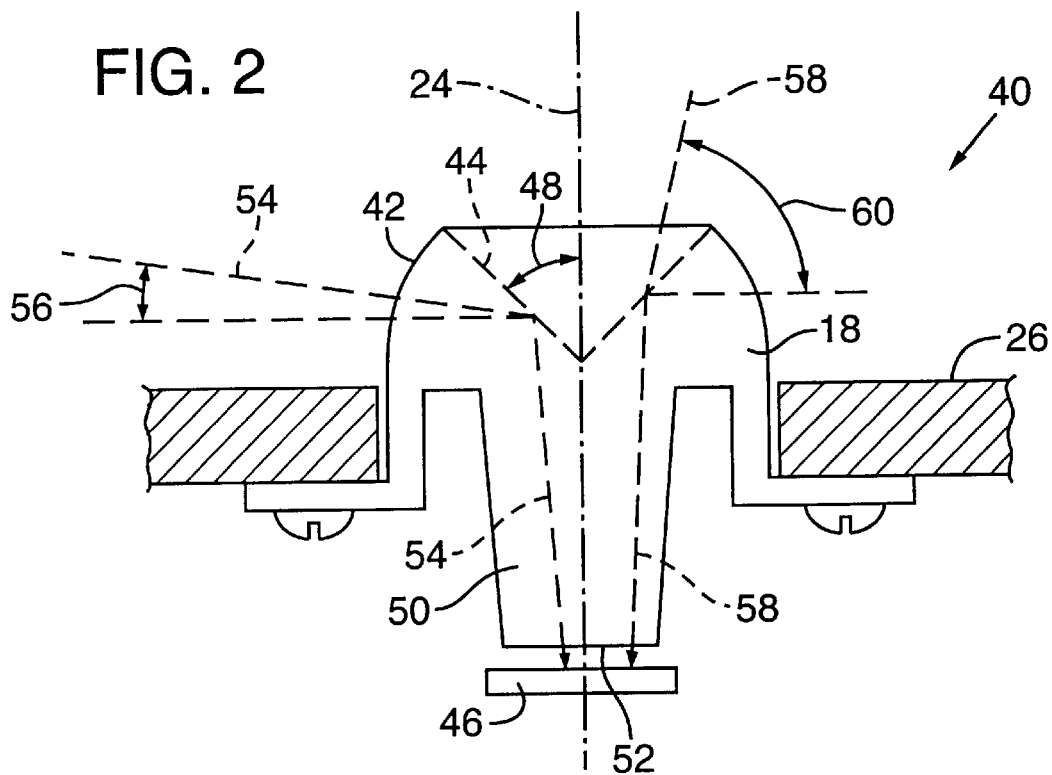
FIG. 2 is an elevation view showing a first embodiment of a non-imaging optical concentrator of this invention.

FIG. 2 shows a first preferred embodiment of optical concentrator 18 employed in an IR receiver 40. Optical concentrator 18 includes a substantially dome-shaped convex surface 42 of revolution formed about optical axis 24 and a substantially conical concave surface 44 of revolution formed about optical axis 24 and protruding into convex surface 42 in a direction along optical axis 24 toward a light sensor 46. The apex of conical concave surface 44 is centered on optical axis 24, and conical concave surface 44 forms a tilt angle 48 measured from optical axis 24. Optical concentrator 18 further includes a light guide portion 50 that extends generally along optical axis 24 in a direction leading from convex surface 42 and concave surface 44 and toward light sensor 46. Light guide portion 50 terminates in a flat surface 52, which, for suitable coupling, is spaced apart less than 2.0 mm from light sensor 46.

In the first preferred embodiment, optical concentrator 18 is formed by injection molding from optically transparent polycarbonate material, tilt angle 48 is 45 degrees, and light sensor 46 is a 3.0 mm by 3.0 mm IR sensitive photodiode. Convex surface 42 is preferably a truncated hemisphere having about a 5.75 mm radius of curvature and concave surface 44 is preferably a right conic surface having about an 8.0 mm base diameter and about a 4.0 mm height. Light guide portion 50 is preferably about a 9.3 mm long tapered cylinder having about a 5.0 mm diameter where it terminates at flat surface 52.

Optical concentrator 18 receives at convex surface 42 first light rays 54 propagating from any of azimuthal angles 30 and from first elevational angles 56 ranging from about 0 degrees to about 15 degrees. First light rays 54 enter convex surface 42, propagate through optical concentrator 18 toward optical axis 24, are reflected off the inside of concave surface 44 in a direction generally along the optical axis through light guide portion 50, exit flat surface 52, and are detected by light sensor 46.

Optical concentrator 18 further receives at concave surface 44 second light rays 58 propagating from any of azimuthal angles 30 and from second elevational angles 60 ranging from about 75 degrees to about 90 degrees. Second light rays 58 enter concave surface 44, are refracted in a direction generally along the optical axis through light guide portion 50, exit flat surface 52, and are detected by light sensor 46.

Figure 3:
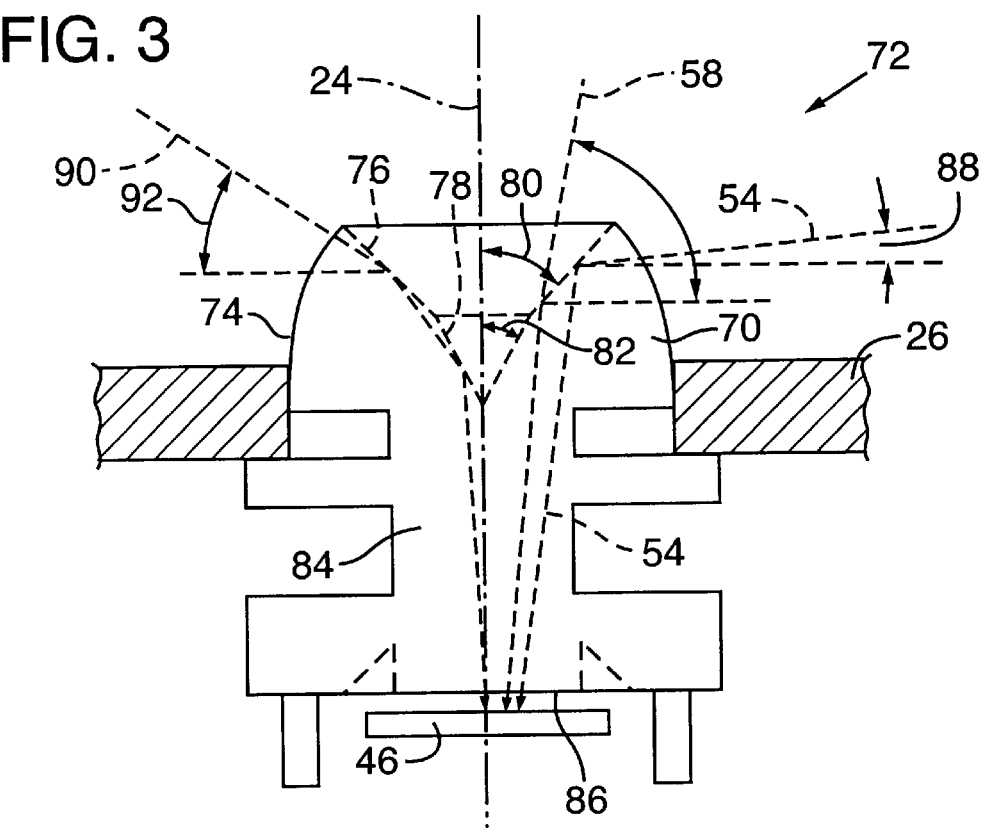
FIG. 3 is an elevation view showing a second embodiment of a non-imaging optical concentrator of this invention.

FIG. 3 shows a second preferred embodiment of an optical concentrator 70 employed in an IR receiver 72. Optical concentrator 70 includes a substantially dome-shaped convex surface 74 of revolution formed about optical axis 24, a substantially conical truncated concave surface 76 of revolution formed about optical axis 24, and a substantially conical concave surface 78 of revolution formed about optical axis 24. Truncated concave surface 76 protrudes at a first tilt angle 80 into convex surface 74, and conical concave surface 78 protrudes at a second tilt angle 82 further into convex surface 74. The apex of conical concave surfaces 76 and 78 are centered on optical axis 24, first tilt angle 80 is preferably about 45 degrees, and second tilt angle 82 is preferably about 26.6 degrees. Optical concentrator 70 further includes a light guide portion 84 that extends generally along optical axis 24 in a direction leading from conical concave surface 78 and toward light sensor 46. Light guide portion 84 terminates in an exit surface 86, which for suitable coupling is preferably flat and spaced apart less than about 2.0 mm from light sensor 46.

In the second preferred embodiment, optical concentrator 70 is formed by injection molding from optically transparent polycarbonate material. Convex surface 74 is preferably a truncated hemisphere having about a 5.75 mm radius of curvature, truncated concave surface 76 is preferably a truncated right conic surface having about a 7.990 mm base diameter and about a 2.0 mm height, and conical concave surface 78 is preferably a right conical surface having about a 3.0 mm base diameter and a 2.995 mm height. Light guide portion 84 is preferably about a 9.63 mm long cylinder having about a 4.0 mm diameter.

Optical concentrator 70 receives at convex surface 74 first light rays 54 propagating from any of azimuthal angles 30 and from first elevational angles 88 ranging from about 0 degrees to about 25 degrees. First light rays 54 enter convex surface 74, propagate through optical concentrator 70 toward optical axis 24, are reflected off the inside of truncated concave surface 76 in a direction generally along optical axis 24 and through light guide portion 84, exit surface 86, and are detected by light sensor 46.

Optical concentrator 70 further receives at truncated concave surface 76 or conical concave surface 78 second light rays 58 propagating from any of azimuthal angles 30 and from second elevational angles 60 ranging from about 75 degrees to about 90 degrees. Second light rays 58 enter truncated concave surface 76 or conical concave surface 78, are refracted in a direction generally along optical axis 24 and through light guide portion 84, exit surface 86, and are detected by light sensor 46.

Optical concentrator 70 still further receives at convex surface 74 third light rays 90 propagating from any of azimuthal angles 30 and from third elevational angles 92 ranging from about 25 degrees to about 45 degrees. Third light rays 90 enter convex surface 74, propagate through optical concentrator 70, are reflected at a first shallow angle off the inside of truncated concave surface 76, are reflected again at a second shallow angle off the inside of conical concave surface 78, propagate in a direction generally along optical axis 24 and through light guide portion 84, exit surface 86, and are detected by light sensor 46.

The materials forming optical concentrators 18 and 70 determine their spectral transmission properties. For detecting visible and near IR light rays, preferred materials include optical glasses, plastics, and, in particular, polycarbonate. For detecting UV light rays, a preferred material is quartz. For detecting IR light rays, preferred materials include quartz, zinc selenide, and germanium-doped materials. Wavelength-selective filtering dyes may be added to the materials to attenuate undesirable ambient light wavelengths, such as from fluorescent lighting. Adding such dyes or, alternatively, a discrete optical filter improves the signal-to-noise ratio of remote controller signals detected by light sensor 46.

Alternative embodiments of optical concentrators 18 and 70 may be optimized to detect light rays propagating from longer distances and smaller ranges of elevational angles or from shorter distances and larger ranges of elevational angles. The parameters of optimization available include changing the size and curvature (shape) of convex surfaces 42 and 74; tilt angles 48, 80, and 82; the area, shape, size, and orientation of concave surfaces 44, 76, and 78; the area and curvature of exit surface 86; and the refractive index and spectral transmission properties of the optical concentrator material. In addition to the spherical and conical surface shapes shown, cylindrical, faceted, elliptical, parabolic, hyperbolic, and combinations thereof may suit particular light detecting applications. Of course, the surfaces need not be symmetrical surfaces of revolution, but may be angularly biased to favor reception of light rays propagating from low elevational angles over a first range of azimuthal angles and to favor reception of light rays propagating from higher elevational angles over a second range of azimuthal angles.

Typically tilt angles 48, 80, and 82 are adjusted to optimize light ray reception over a particular range of elevational angles. In applications in which the light rays propagate from a broader range of elevational angles and a minimal range of distances is required over any azimuthal angle, a compound optical concentrator, such as the one shown in FIG. 3, is preferred.

In general, optical concentrators of this invention operate in two primary modes. For receiving light rays propagating from low elevational angles (greater than the tilt angle) the optical concentrator works in reflective mode, and for receiving light rays propagating from higher elevational angles (less than the tilt angle) the optical concentrator works in refractive mode. This dual mode operation is referred to as aperture sharing, which results in a compact, relatively simple IR receiver employing a single IR sensor and having usable sensitivity to received IR energy over a wide range of azimuthal and elevation angles. Of course, the invention is adaptable for use with other light ray wavelengths.

Skilled workers will recognize that many changes may be made to the details of the above-described embodiments of this invention without departing from the underlying principles thereof. Accordingly, it will be appreciated that this invention is also applicable to light sensor applications other than those found in remote controls for multimedia projectors. The scope of the present invention should, therefore, be determined only by the following claims.

What is claimed is:

1. A non-imaging optical concentrator apparatus for receiving light rays propagating from a range of elevational and azimuthal angles relative to an optical axis and for directing the light rays toward a light sensor positioned along the optical axis, comprising:
   an optically transparent body having at least first and second surfaces;
   the first surface receiving first light rays propagating from a first range of elevational angles and causing the first light rays to propagate through the optically transparent body toward the optical axis;
   the second surface receiving the first light rays propagating from the first surface and reflecting the first light rays generally along the optical axis toward the light sensor; and
   the second surface further receiving second light rays propagating from a second range of elevational angles and refracting the second light rays through the optically transparent body toward the light sensor.

2. The apparatus of claim 1 in which the first surface is a substantially dome-shaped convex surface of revolution formed about the optical axis and the second surface is a substantially conical concave surface of revolution formed about the optical axis and protruding into the first surface in a direction along the optical axis.

3. The apparatus of claim 1 in which the optically transparent body further includes a light guide portion that extends generally along the optical axis in a direction leading from the first and second surfaces and toward the light sensor.

4. The apparatus of claim 3 in which the light guide portion is generally cylindrical.

5. The apparatus of claim 3 in which the light guide portion includes a tapered cross-sectional area that diminishes in the direction toward the light sensor.

6. The apparatus of claim 1 in which the first and second light rays include infrared wavelengths and the light sensor is sensitive to the infrared wavelengths of the first and second light rays.

7. The apparatus of claim 1 in which the optically transparent body includes a wavelength-selective filtering material.

8. The apparatus of claim 1 in which the first range of elevational angles includes about 0 degrees to about 25 degrees.

9. The apparatus of claim 1 in which the second range of elevational angles includes about 75 degrees to about 90 degrees.

10. A method for receiving light rays propagating from a range of elevational and azimuthal angles relative to an optical axis and redirecting the light rays toward a light sensor positioned along the optical axis, comprising:
    providing an optically transparent body having at least first and second surfaces;
    receiving at the first surface first light rays propagating from a first range of elevational angles, the first surface causing the first light rays to propagate through the optically transparent body toward the optical axis;
    receiving at the second surface the first light rays propagating from the first surface;

reflecting the first light rays off the second surface in a direction generally along the optical axis toward the light sensor;

receiving at the second surface second light rays propagating from a second range of elevational angles; and refracting the second light rays through the second surface in the direction generally along the optical axis toward the light sensor.

11. The method of claim 10 in which the optically transparent body further includes at least a third surface and the method further includes:

receiving at the first surface third light rays propagating from a third range of elevational angles, the first surface causing the third light rays to propagate through the optically transparent body toward the third surface; and reflecting the third light rays off the third surface in a direction generally along the optical axis toward the light sensor.

12. The method of claim 11 further including shaping the first, second, and third surfaces to include at least one of a cylindrical portion, a dome-shaped portion, a spherical portion, a conical portion, and a faceted portion.

13. The method of claim 11 in which the providing step further includes shaping at least one of the first, second, and third surfaces as substantially symmetrical surfaces of revolution formed about the optical axis.

14. The method of claim 13 in which the first, second, and third light rays further propagate from a range of azimuthal angles relative to the optical axis.

15. The method of claim 14 in which the azimuthal angles range from about 0 degrees to about 360 degrees.

16. The method of claim 10 in which the providing step further includes:

shaping the first surface as a substantially dome-shaped convex surface of revolution formed about the optical axis; and shaping the second surface as a substantially conical concave surface of revolution formed about the optical axis and protruding into the first shape in a direction along the optical axis.

17. The method of claim 10 in which the providing step further includes forming in the optically transparent body a light guide portion that extends generally along the optical axis in a direction leading from the first and second surfaces and toward the light sensor.

18. The method of claim 17 in which the light guide portion is generally cylindrical.

19. The method of claim 17 in which the light guide portion includes a tapered cross-sectional area that diminishes in the direction toward the light sensor.

20. The method of claim 10 further including manufacturing the optically transparent body so as to include a wavelength-selective filtering material.

21. A non-imaging optical concentrator apparatus for receiving light rays propagating from a range of elevational and azimuthal angles relative to an optical axis and for directing the light rays toward a light sensor positioned along the optical axis, comprising:

an optically transparent body;

a first surface on the optically transparent body receiving first light rays propagating from a first range of elevational angles and refracting the first light rays through the optically transparent body toward the optical axis;

a second surface on the optically transparent body receiving the first light rays propagating from the first surface and reflecting the first light rays generally along the optical axis toward the light sensor, the second surface further receiving second light rays propagating from a second range of elevational angles and refracting the second light rays through the optically transparent body toward the light sensor; and a third surface on the optically transparent body positioned such that when the first surface receives third light rays propagating from a third range of elevational angles, the first surface refracts the third light rays through the optically transparent body toward the third surface, which reflects the third light rays toward the light sensor.

22. The apparatus of claim 21 in which the first, second, and third surfaces each include at least one of a cylindrical portion, a dome-shaped portion, a spherical portion, a conical portion, and a faceted portion.

23. The apparatus of claim 21 in which at least one of the first, second, and third surfaces are substantially symmetrical surfaces of revolution formed about the optical axis.

24. The apparatus of claim 21 in which the first, second, and third light rays further propagate from a range of azimuthal angles relative to the optical axis.

25. The apparatus of claim 24 in which the azimuthal angles range from about 0 degrees to about 360 degrees.

26. The apparatus of claim 21 in which the first surface is a substantially dome-shaped convex surface of revolution formed about the optical axis and the second surface is a substantially conical concave surface of revolution formed about the optical axis and protruding into the optically transparent body in a direction along the optical axis.

27. The apparatus of claim 21 in which the second surface includes a truncation and the third surface is a substantially conical concave surface of revolution formed about the optical axis and protruding from the truncation of the second surface into the optically transparent body in a direction along the optical axis.

28. The apparatus of claim 21 in which the optically transparent body further includes a light guide portion that extends generally along the optical axis in a direction leading from the first, second, and third surfaces and toward the light sensor.

29. The apparatus of claim 28 in which the light guide portion is generally cylindrical.

30. The apparatus of claim 28 in which the light guide portion includes a tapered cross-sectional area that diminishes in the direction toward the light sensor.

31. The apparatus of claim 21 in which the first, second, and third light rays include infrared wavelengths and the light sensor is sensitive to the infrared wavelengths.

32. The apparatus of claim 21 in which the optically transparent body includes a wavelength-selective filtering material.

33. The apparatus of claim 21 in which the first range of elevational angles includes about 0 degrees to about 25 degrees.

34. The apparatus of claim 21 in which the second range of elevational angles includes about 75 degrees to about 90 degrees.

35. The apparatus of claim 21 in which the third range of elevational angles includes about 25 degrees to about 45 degrees.

* * * * *